US009209643B2

(12) United States Patent
Nishikawa

(10) Patent No.: US 9,209,643 B2
(45) Date of Patent: Dec. 8, 2015

(54) BATTERY SYSTEM, BATTERY CONTROL DEVICE, ELECTRIC VEHICLE, MOBILE BODY, AND POWER SOURCE DEVICE

(75) Inventor: Kazufumi Nishikawa, Osaka (JP)

(73) Assignee: PANASONIC INTELLECTUAL PROPERTY MANAGEMENT CO., LTD. (JP)

( * ) Notice: Subject to any disclaimer, the term of this patent is extended or adjusted under 35 U.S.C. 154(b) by 137 days.

(21) Appl. No.: 14/235,682

(22) PCT Filed: Jul. 25, 2012

(86) PCT No.: PCT/JP2012/004749
§ 371 (c)(1),
(2), (4) Date: Jan. 28, 2014

(87) PCT Pub. No.: WO2013/014930
PCT Pub. Date: Jan. 31, 2013

(65) Prior Publication Data
US 2014/0167657 A1 Jun. 19, 2014

(30) Foreign Application Priority Data

Jul. 28, 2011 (JP) .................................. 2011-165270

(51) Int. Cl.
*H02P 1/00* (2006.01)
*H02J 7/00* (2006.01)
(Continued)

(52) U.S. Cl.
CPC ............. *H02J 7/007* (2013.01); *B60L 11/1803* (2013.01); *B60L 11/1805* (2013.01); *B60L 11/1853* (2013.01); *B60L 11/1857* (2013.01); *B60L 11/1859* (2013.01); *B60L 11/1864* (2013.01); *B60L 15/2009* (2013.01);
(Continued)

(58) Field of Classification Search
CPC ......... H02J 7/04; H02M 10/44; H02M 10/441; Y02E 60/12
USPC ............................................. 318/139; 324/426
See application file for complete search history.

(56) References Cited

U.S. PATENT DOCUMENTS 6,600,293 B2 * 7/2003 Kikuchi ..................... 320/131
6,608,482 B2 * 8/2003 Sakai et al. ................. 324/426
(Continued)

FOREIGN PATENT DOCUMENTS

JP 2003-244854 A 8/2003
JP 2007-274806 A 10/2007
(Continued)

OTHER PUBLICATIONS

International Search Report for International Application No. PCT/JP2012/004749, mailed Aug. 21, 2012, with English translation.

*Primary Examiner* — Rina Duda
(74) *Attorney, Agent, or Firm* — Cantor Colburn LLP

(57) ABSTRACT

A battery module group includes a plurality of battery groups. Each battery group includes a plurality of battery modules. Cell information is supplied from each battery module of the battery module group to a charge/discharge controller. The charge/discharge controller controls the turning on and off of a plurality of switching elements of a connector based on the supplied cell information of each battery module. The plurality of switching elements correspond to the plurality of battery groups, respectively. Thus, the plurality of battery groups are selectively connected to an external object via a DC/AC converter.

17 Claims, 10 Drawing Sheets

(51) Int. Cl.
- *H01M 10/44* (2006.01)
- *H01M 10/48* (2006.01)
- *B60L 11/18* (2006.01)
- *B60L 15/20* (2006.01)
- *H01M 10/42* (2006.01)

(52) U.S. Cl.
CPC ......... *H01M 10/441* (2013.01); *H01M 10/482* (2013.01); *B60L 2210/10* (2013.01); *B60L 2210/40* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2240/662* (2013.01); *B60L 2250/10* (2013.01); *B60L 2250/12* (2013.01); *B60L 2250/16* (2013.01); *B60L 2250/26* (2013.01); *B60L 2260/46* (2013.01); *H01M 2010/4271* (2013.01); *H01M 2220/20* (2013.01); *Y02T 10/642* (2013.01); *Y02T 10/7005* (2013.01); *Y02T 10/7061* (2013.01); *Y02T 10/7216* (2013.01); *Y02T 10/7241* (2013.01); *Y02T 10/7275* (2013.01); *Y02T 10/7291* (2013.01); *Y02T 90/16* (2013.01)

(56) References Cited

U.S. PATENT DOCUMENTS

| | | | | |
|---|---|---|---|---|
| 7,554,330 | B2 * | 6/2009 | Ashtiani et al. | 324/426 |
| 7,880,597 | B2 * | 2/2011 | Uchida | 340/439 |
| 8,035,395 | B2 * | 10/2011 | Suzuki et al. | 324/427 |
| 2009/0040033 | A1 | 2/2009 | Uchida | |
| 2009/0284225 | A1 | 11/2009 | Nakanuma et al. | |
| 2010/0264929 | A1 * | 10/2010 | Ugaji et al. | 324/426 |

FOREIGN PATENT DOCUMENTS

| | | |
|---|---|---|
| JP | 2009-017752 A | 1/2009 |
| JP | 2009-240154 A | 10/2009 |
| JP | 2010-028876 A | 2/2010 |

* cited by examiner

F I G. 7

BATTERY STATUS CONFIRMATION SCREEN

| GROUP NUMBER | MODULE NUMBER | TARGET USING PERIOD TARGET REMAINING PERIOD (YEAR) | CURRENT SOH (%) | LIFE SOH (%) | MINIMUM ESTIMATION SOH (%) | SOH MARGIN (%) | CHARGE/ DISCHARGE PRIORITY ORDER | DISCHARGE RATIO (%) |
|---|---|---|---|---|---|---|---|---|
| 1 | A1~Ax | 5 3 | 80 | 60 | 65 | 12.5 | 1 | 40 |
| 2 | B1~Bx | 6 5 | 90 | 50 | 55 | 10 | 2 | 30 |
| ... | ... | ... | ... | ... | ... | ... | ... | ... |

.# BATTERY SYSTEM, BATTERY CONTROL DEVICE, ELECTRIC VEHICLE, MOBILE BODY, AND POWER SOURCE DEVICE

This is the U.S. national stage of application No. PCT/JP2012/004749, filed on 25 Jul. 2012. Priority under 35 U.S.C. §119(a) and 35 U.S.C. §365(b) is claimed from Japanese Application No. 2011-165270, filed 28 Jul. 2011, the disclosure of which is also incorporated herein by reference.

TECHNICAL FIELD

The present invention relates to a battery system, a battery control device, an electric vehicle, a movable object and a power source device.

BACKGROUND ART

A battery system that includes a control device that controls a plurality of battery modules, and charging and discharging of those battery modules is used for a movable object such as an electric automobile or a power source device that stores electric power. In the battery system, a life-span of each battery module is expected to be further lengthened.

A battery control device described in the patent document 1 includes a battery ECU (Electronic Control Unit) that detects the state of a battery. The battery ECU calculates a total deterioration amount that shows the deterioration state of the battery at a current time point, and a target deterioration amount that shows the deterioration state of the battery that is allowed depending on the duration of use. The battery ECU controls the charging and discharging of the battery such that the total deterioration amount of the battery is closer to the target deterioration amount. Thus, the life-span of the battery can be maintained until a target using period.

[Patent Document 1] JP 2009-17752 A

SUMMARY OF INVENTION

However, in the battery control device described in the above-mentioned patent document 1, when the total deterioration amount of the battery is more than the target deterioration amount, the discharging of the battery is stopped. Thus, necessary electric power is not obtained.

In order to obtain the necessary electric power, it is necessary to prepare the plurality of batteries, and to selectively use the plurality of batteries. As the method for selectively using the plurality of batteries, it is considered that the battery having the smaller current deterioration amount is used on a priority basis. However, in this case, part of the batteries reaches the end of its life before the end of the target using period, thereby not being able to be used.

An object of the present invention is to provide a battery system, a battery control device, an electric vehicle, a movable object and a power source device in which part of battery modules can be prevented from becoming unusable before the end of a target using period.

According to one aspect of the present invention, a battery system includes a plurality of battery groups that respectively include at least one battery module including at least one battery cell, and have predetermined target using periods, a connector for selectively connecting the plurality of battery groups to an external object, and a controller that calculates a margin at the end of the target using period of each battery group based on a deterioration amount of each battery group, and controls the connector based on the calculated margin.

The present invention enables part of the battery modules to be prevented from becoming unusable before the end of the target using period.

BRIEF DESCRIPTION OF DRAWINGS

FIG. 7 is a diagram showing one example of a battery state confirmation screen.

DESCRIPTION OF EMBODIMENTS

Figure 1:
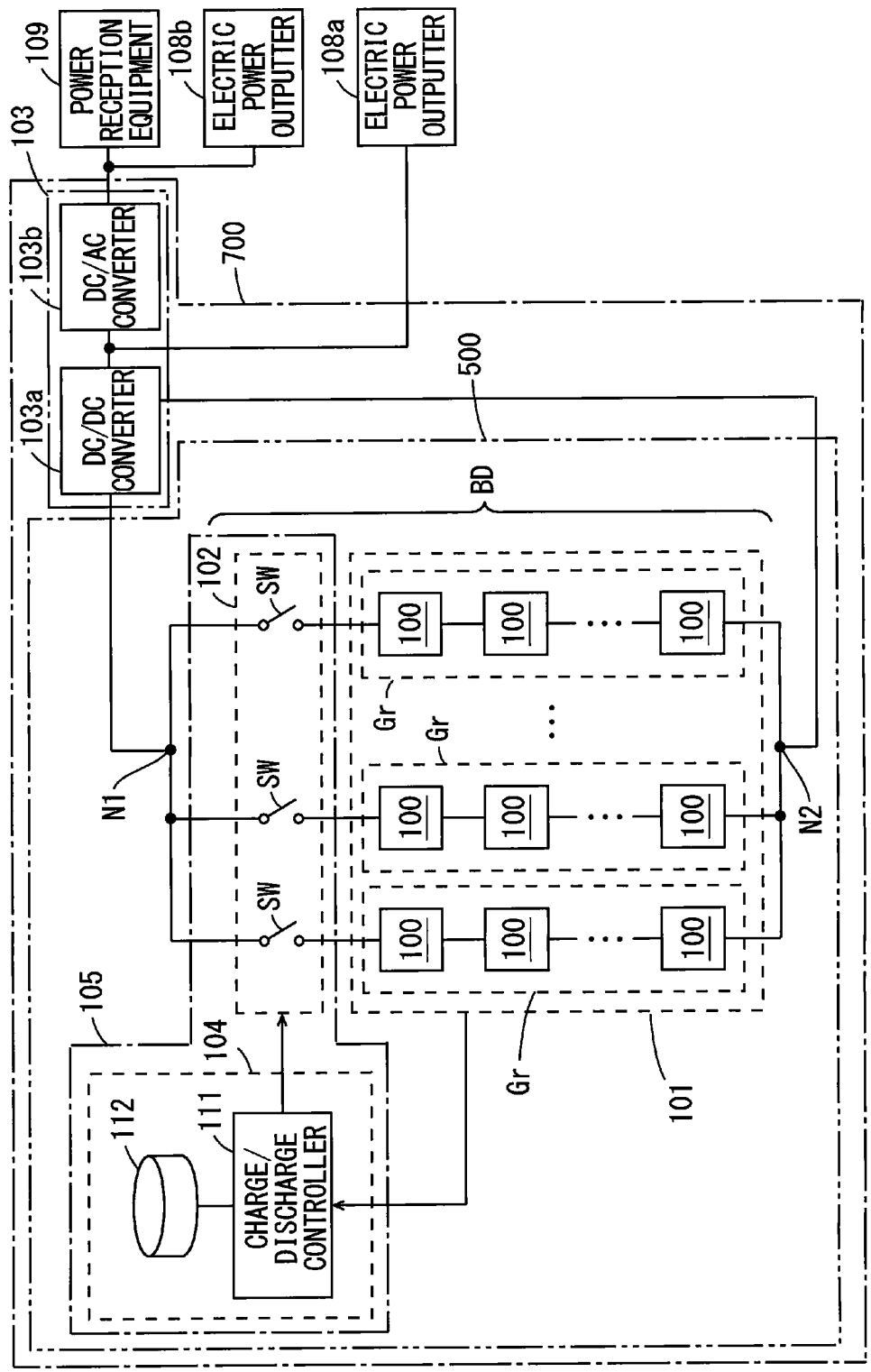
FIG. 1 is a block diagram showing the configuration of a battery system, a battery control device and a power source device according to embodiments.

A battery system according to one embodiment of the present invention includes a plurality of battery groups that respectively include at least one battery module including at least one battery cell, and has a predetermined target using period, a connecter for selectively connecting the plurality of battery groups to an external object, and a controller that calculates a margin at the end of the target using period of each battery group based on a deterioration amount of each battery group, and controls the connecter based on the calculated margin.

In the battery system, the plurality of battery groups are selectively connected to the external object by the connecter. Each battery group includes at least the one battery module, and has the predetermined target using period. The margin at the end of the target using period of each battery group is calculated based on the deterioration amount of each battery group, and the connecter is controlled based on the calculated margin.

In this case, a frequency or order of the charging and discharging of each battery group can be adjusted according to the calculated margin. Therefore, that part of the battery group becomes unusable before the end of the target using period regardless of the existence of the battery group that can be used after the end of the target using period, can be prevented. Here, that the battery group becomes unusable, means that the margin of the battery group is not more than zero. Further, at the end of the target using period, the margin of the battery group is preferably more than zero and close to zero. The present invention enables the margin of each battery group to be more than zero and to be closer to zero at the end of the target using period.

The controller may control the connecter such that the battery group having the relatively high margin is charged and discharged on a priority basis.

In this case, part of the battery group Gr can be more reliably prevented from becoming unusable before the end of the target using period.

The controller may estimate a deterioration amount of each battery group at the end of the target using period, and may calculate the margin based on the estimated deterioration amount and an allowable value of the predetermined deterioration amount.

In this case, for example, in a case in which the estimated deterioration amount is more than the allowable value, the larger the difference is, the higher the margin is. In this manner, the appropriate margin can be easily calculated.

The controller may store a history of the deterioration amount of each battery group, and may estimate the deterioration amount of each battery group at the end of the target using period based on the stored history.

In this case, it is possible to appropriately estimate the deterioration amount of each battery group at the end of the target using period according to the intended purpose and the usage environment of the battery system by storing the history of the deterioration amount of each battery group. Thus, the appropriate margin can be calculated.

The controller may learn a tendency of changes in deterioration amount of each battery group, and may estimate the deterioration amount of each battery group at the end of the target using period based on the learnt tendency of the changes.

In this case, it is possible to appropriately estimate the deterioration amount of each battery group at the end of the target using period according to the difference in outside air temperature that depends on the time of the year and the difference in frequency of usage of the battery system by learning the tendency of the changes in deterioration amount of each battery group. Thus, the appropriate margin can be calculated.

The battery system may further include a presentation unit for presenting information of each battery group.

In this case, the information of each battery group can be easily recognized. Thus, a user, a service man or the like can easily and accurately confirm the past state, the current state and the state at the end of the target using period of each battery group. Therefore, it is possible to easily and appropriately perform installation or the like of the battery system.

A battery control device according to another embodiment of the present invention controls charging and discharging of a plurality of battery groups that respectively include at least one battery module including at least one battery cell and have predetermined target using periods, includes a connector for selectively connecting the plurality of battery groups to an external object, and a controller that calculates a margin at the end of the target using period of each battery group based on a deterioration amount of each battery group, and controls the connector based on the calculated margin.

In the battery control device, the margin at the end of the target using period of each battery group is calculated based on the deterioration amount of each battery group, and the connecter is controlled based on the calculated margin. Thus, the plurality of battery groups are selectively connected to the external object.

Thus, the frequency and the order of charging and discharging of each battery group can be adjusted according to the calculated margin. Therefore, that part of the battery becomes unusable before the end of the target using period regardless of the existence of the battery group that can be used after the end of the target using period, can be prevented.

An electric vehicle according to yet another embodiment of the present invention includes the battery system according to the above-mentioned embodiment, a motor driven by electric power from the battery system, and a drive wheel that is rotated by a torque of the motor.

In the electric vehicle, the motor is driven by the electric power supplied from the above-mentioned battery system. The drive wheel is rotated by the torque of the motor, so that the electric vehicle is moved. In this case, the above-mentioned battery system is used, so that part of the battery group can be prevented from becoming unusable before the end of the target using period. Thus, reliability of the electric vehicle is improved.

A movable object according to yet another embodiment of the present invention includes the battery system according to the above-mentioned embodiment, a mobile main body, a power source that converts electric power from the battery system into power, and a driving unit that moves the mobile main body by the power obtained in conversion by the power source.

In the movable object, the electric power supplied from the above-mentioned battery system is converted into power by the power source, and the driving unit moves the mobile main body by the power. In this case, the above-mentioned battery system is used, so that part of the battery group can be prevented from becoming unusable before the end of the target using period. Thus, reliability of the movable object is improved.

A power source device according to yet another embodiment of the present invention that is connectable to an external object includes the battery system according to the above-mentioned embodiment, a power conversion device that performs power conversion between the battery system and the external object, and a system controller that performs control regarding discharging and charging of each battery group of the battery system by controlling the power conversion device.

In the power source device, the power conversion is performed by the power conversion device between the plurality of battery cells and the external object. The power conversion device is controlled by the system controller such that the control regarding the charging and discharging of the plurality of battery cells is performed. Thus, deterioration, overcharge and overdischarge of the plurality of battery cells can be prevented. Further, the above-mentioned battery system is used, so that part of the battery group can be prevented from becoming unusable before the end of the target using period. Thus, reliability of the power source device is improved.

The battery system, the battery control device, the electric vehicle, the movable object and the power source device according to the embodiments of the present invention will be described below with reference to drawings.

(1) Battery System, Battery Control Device and Power Source Device

The battery system, the battery control device and the power source device according to the first embodiment of the present invention will be described.

(1-1) Configuration

FIG. 1 is a block diagram showing the configuration of the battery system, the battery control device and the power source device according to the embodiments of the present invention. As shown in FIG. 1, the power source device 700 includes the battery system 500 and the power conversion device 103. The battery system 500 is a power storage device and includes a battery device BD and a controller 104.

The battery device BD has a battery group 101 and a connector 102. The battery group 101 includes the plurality of battery groups Gr. Each battery group Gr includes a plurality of battery modules 100. Each battery module 100 includes at least one battery cell. The plurality of battery modules 100 of each battery group Gr are connected to each other in series.

The characteristics of the plurality of battery modules 100 included in the common battery group Gr are substantially the same. On the other hand, the characteristics of the battery module 100 may differ among the different battery groups Gr. Here, the characteristics of the battery module 100 include a full charge capacity, a remaining capacity, energy density, a capacity maintenance ratio, duration of use and the like of the battery module 100.

The connector 102 includes a plurality of switching elements SW that respectively correspond to the plurality of battery groups Gr. The battery module 100 positioned at one end of each battery group Gr is connected to a node N1 via the corresponding switching element SW. The battery module 100 positioned at the other end of each battery group Gr is connected to a node N2. The nodes N1, N2 are connected to the power conversion device 103.

The power conversion device 103 includes a DC/DC (Direct Current/Direct Current) converter 103a and a DC/AC (Direct Current/Alternate Current) converter 103b. The nodes N1, N2 are connected to the DC/DC converter 103a, an electric power outputter 108a is connected between the DC/DC converter 103a and the DC/AC converter 103b, and the electric power outputter 108b and a power reception equipment 109 are connected to the DC/AC converter 103b. The electric power outputters 108a, 108b and the power reception equipment 109 are examples of the external object of the battery system 500 and the power source device 700. The electric power outputters 108a, 108b include receptacles, for example. Various types of loads are connected to the electric power outputters 108a, 108b. The power reception equipment 109 includes a commercial power supply, a solar battery or the like, for example.

If the battery system 500 and the external object can supply each other the electric power, the power conversion device 103 may have only one of the DC/DC converter 103a and the DC/AC converter 103b. Alternatively, the power conversion device 103 does not have to be provided.

The controller 104 is an example of the controller and the system controller. The controller 104 includes a charge/discharge controller 111 and a storage 112. The charge/discharge controller 111 includes a CPU (Central Processing Unit) and a memory, or a microcomputer, for example. The storage 112 is made of a hard disc, for example. A battery control device 105 is constituted by the controller 104 and the connector 102. Cell information is supplied from each battery module 100 of the battery group 101 to the charge/discharge controller 111. The cell information includes a terminal voltage value and a temperature of each battery cell, and a value of current that flows in each battery cell and the like.

The charge/discharge controller 111 calculates the deterioration amount of each battery group Gr based on the supplied cell information of each battery module 100, and calculates the margin at the end of the target using period of each battery group Gr based on the calculated deterioration amount. Further, the charge/discharge controller 111 controls the turning on and off of each switching element SW of the connector 102 based on the calculated margin. Thus, the plurality of battery groups Gr are selectively connected to the external objects (the electric power outputters 108a, 108b, and the power reception equipment 109) via the electric power conversion device 103. Hereinafter, the battery group Gr connected to the external object is referred to as a connection battery group Gr.

Further, the charge/discharge controller 111 performs the control regarding the charging or discharging of the connection battery group Gr by controlling the power conversion device 103. At the time of the discharging of the connection battery group Gr, the electric power supplied from the connection battery group Gr is converted in the DC/DC (Direct Current/Direct Current) conversion by the DC/DC converter 103a, and further converted in the DC/AC (Direct Current/Alternate Current) conversion by the DC/AC converter 103b. The electric power obtained in the DC/DC conversion by the DC/DC converter 103a is supplied to the electric outputter 108a, and the electric power obtained in the DC/AC conversion by the DC/AC converter 103b is supplied to the electric outputter 108b. DC electric power is supplied to the load from the electric outputter 108a, and AC electric power is supplied to the load from the electric outputter 108b. The electric power obtained in the DC/AC conversion by the DC/AC converter 103b may be supplied to the power reception equipment 109.

The charge/discharge controller 111 performs the following control as one example of the control regarding the discharging of the connection battery group Gr. At the time of the discharging of the connection battery group Gr, the charge/discharge controller 111 determines whether or not the discharging is stopped based on the cell information of the connection battery group Gr, and controls the power conversion device 103 based on the result of determination. Specifically, if the charged capacity of any one battery cell of the one or plurality of battery cells included in the connection battery group Gr is less than a predetermined threshold value, the charge/discharge controller 111 controls the per conversion device 103 such that the discharging is stopped or a discharging current (or discharging electric power) is limited. Thus, overdischarge of each battery cell is prevented.

At the time of the charging of the connection battery group Gr, the AC electric power supplied from the power reception equipment 109 is converted in the AC/DC (Alternate Current/Direct Current) conversion by the DC/AC converter 103b, and is further converted in the DC/DC (Direct Current/Direct Current) conversion by the DC/DC converter 103a. The electric power converted in the DC/DC conversion by the DC/DC converter 103a is supplied to the connection battery group Gr.

The charge/discharge controller 111 performs the following control as one example of the control regarding the charging of the connection battery group Gr. At the time of the charging of the connection battery group Gr, the charge/discharge controller 111 determines whether or not the charging is stopped based on the cell information of the connection battery group Gr, and controls the electric conversion device 103 based on the result of determination. Specifically, if the charged capacity of any one battery cell of the one or plurality of battery cells included in the connection battery group Gr is more than a predetermined threshold value, the charge/discharge controller 111 controls the electric conversion device 103 such that the charging is stopped or a charging current (or charging electric power) is limited. Thus, overcharge of each battery cell is prevented.

While the controller 104 performs both the control of the connector 102 and the control of the power conversion device 103 in the present example, the invention is not limited to this. The system controller that controls the power conversion device 103 may be separately provided from the controller 104.

In the battery system 500 according to the present embodiment, the plurality of battery groups Gr are selectively connected to the external object by the connector 102. Each battery group Gr includes at least one battery module 100 and has a predetermined target using period. The margin at the end of the target using period of each battery group Gr is calculated based on the deterioration amount of each battery group Gr, and the connector 102 is controlled based on the calculated margin by the charge/discharge controller 111.

In this case, the frequency or the order of charging and discharging of each battery group Gr can be adjusted according to the calculated margin. Therefore, that part of the battery group Gr becomes unusable before the end of the target using period regardless of the existence of the battery group Gr that can be used after the end of the target using period, can be prevented. Further, it is possible to bring the margin of each battery group Gr closer to zero at the end of the target using period.

(1-2) Deterioration Amount

In the present embodiment, the charging and discharging of each battery module 100 is controlled according to the deterioration amount of each battery module 100. As the deterioration amount, there are an SOH (State of health), a capacity maintenance factor, a full charge capacity, internal resistance or the like, for example. The SOH is used as the deterioration amount in the present embodiment. The SOH is expressed in the following equation (1).

[Formula 1]

$$SOH = \frac{\text{CURRENT FULL CHARGE CAPACITY (Ah)}}{\text{INITIAL FULL CHARGE CAPACITY (Ah)}} \times 100 \ [\%] \quad (1)$$

The current full charge capacity in the equation (1) can be estimated based on the cell information of each battery module 100, for example. Further, each battery module 100 is charged until a remaining capacity changes from a state of zero to a full charge state and a value of the current that flows during the period is accumulated, whereby the current full charge capacity is obtained. It is known that the higher frequency of the charging and discharging is, in the shorter period of time the SOH decreases.

As described above, the characteristics of the plurality of battery modules 100 included in the common battery module Gr are substantially the same. Thus, the SOH of the plurality of battery modules 100 included in the common battery group Gr is substantially the same. On the other hand, among the different battery groups Gr, the characteristics of the battery module 100 may differ. In that case, the SOH of each battery module 100 of the one battery group Gr and the SOH of each battery module 100 of another battery group Gr are different.

In the present embodiment, a life SOH and the target using period are set for every battery group Gr. The life SOH is an example of the allowable value of the deterioration amount, and a value of the SOH at which the use of each battery module 100 is allowed. When the SOH is lower than the life SOH, it is necessary to replace the battery module 100. The target using period is a target period in which the SOH is to be maintained higher than the life SOH.

The life SOH and the target using period are determined by simulation and the like based on the type, usage and the like of the battery module 100. When the battery system 500 is used for the intended purpose having the relatively high frequency of the charging and discharging, the target using period is set relatively short. For example, as described below, when the battery system 500 is used as a driving source of an electric automobile 600 (see after-mentioned FIG. 10), the target using period is preferably set in a range of not less than two years and not more than five years, for example. It is set to two years, for example. On the other hand, when the battery system 500 is used for the intended purpose having the relatively low frequency of the charging and discharging, the target using period is set relatively long. For example, when the battery system 500 is used as a power supply for emergency, the target using period is preferably set in a range of not less than ten years and not more than twenty years, for example. It is set to ten years, for example.

Figure 2:
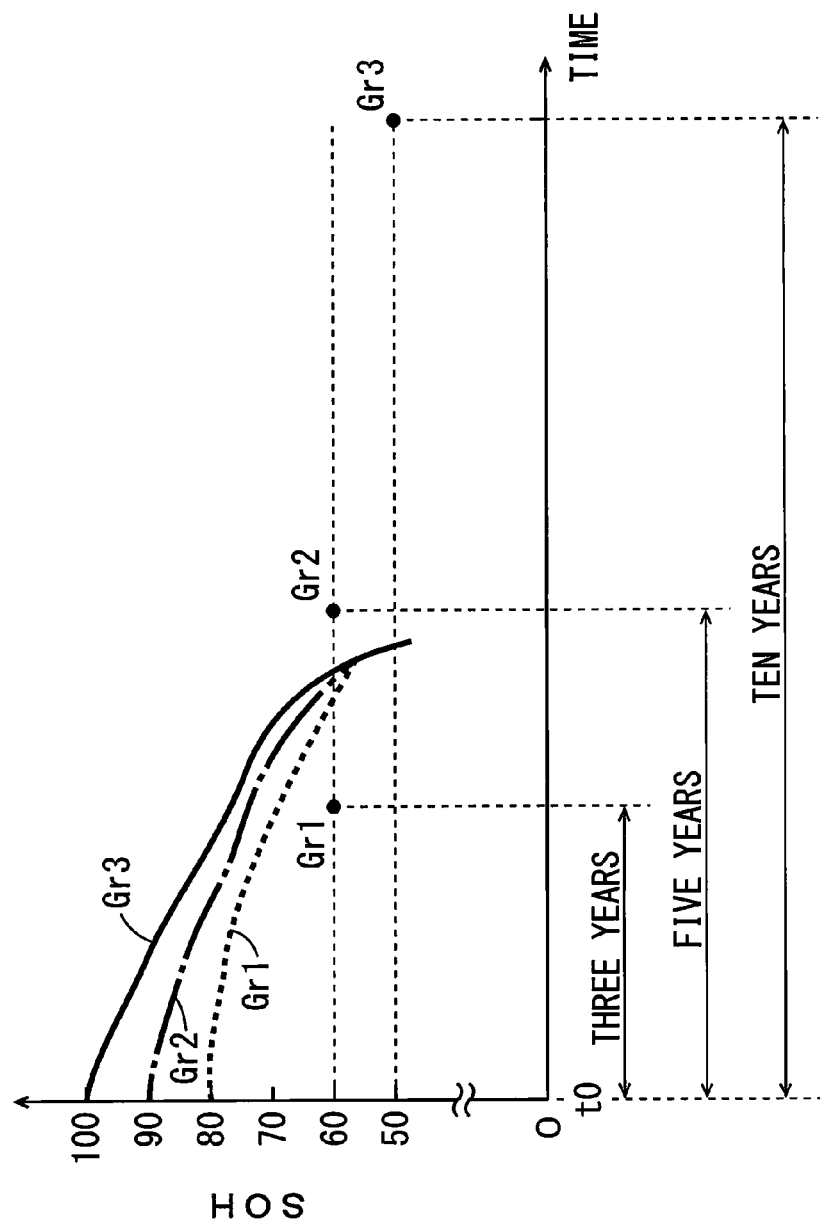
FIG. 2 is a diagram showing the changes in SOH of each battery group when a battery group having the higher SOH is charged and discharged on a priority basis.

As the control of the charging and discharging of each battery module 100 that corresponds to the SOH of each battery module 100, it is considered that the battery group Gr having the higher current SOH is charged and discharged on a priority basis. Here, the SOH of the battery group Gr refers to the smallest value among the SOH of the plurality of battery modules 100 that constitute each battery group Gr, for example. FIG. 2 is a diagram showing the changes in SOH of each battery group Gr when the battery group Gr having the higher current SOH is charged and discharged on a priority basis. In FIG. 2 and subsequent FIGS. 3 and 8, the abscissa indicates time, and the ordinate indicates the SOH.

In the example of FIG. 2, the three battery groups Gr are used as the battery group 101. In the following description, the three battery groups Gr are referred to as the battery groups Gr1, Gr2, Gr3. In the table 1, the SOH of the battery groups Gr1 to Gr3 at a time point t0 of FIG. 2, the remaining period (hereinafter referred to as a remaining target period) of the target using period at the time point t0 of FIG. 2 and the life SOH are shown. The target remaining period of the battery group Gr1 is three years, the target remaining period of the battery group Gr2 is five years and the target remaining period of the battery group Gr3 is ten years.

TABLE 1

| BATTERY GROUP | SOH AT TIME POINT t0 [%] | TARGET REMAINING PERIOD [YEAR] | LIFE SOH [%] |
| --- | --- | --- | --- |
| Gr1 | 80 | 3 | 60 |
| Gr2 | 90 | 5 | 60 |
| Gr3 | 100 | 10 | 50 |

As shown in FIG. 2, when the battery group Gr having the higher SOH at present (time point t0) is charged and discharged on a priority basis, the rate of diminution of the SOH with respect to the time axis direction of the battery group Gr1 having the lower SOH at present (time point t0) is relatively low. On the other hand, the rate of diminution of the SOH with respect to the time axis direction of the battery groups Gr3, Gr2 having the higher SOH at present (time point t0) is relatively high in this order. Thus, regarding the battery group Gr1, the SOH is kept higher than the life SOH (60%) at the end of the target using period (a time point at which three years has elapsed from the time point t0). On the other hand, regarding the battery group Gr2, the SOH is lower than the life SOH (60%) before the end of the target using period (a time point at which five years has elapsed from the time point t0). Regarding the battery group Gr3, the SOH is lower than the life SOH (50%) before the end of the target using period (a time point at which ten years has elapsed from the time point t0).

In this manner, regarding the battery group Gr1 in which the charging and discharging is suppressed in order to prevent the deterioration due to the lower SOH at the time point t0, it can be used until the end of the target using period. On the other hand, at the time point t0, regarding the battery groups Gr2, Gr3 that are charged and discharged on a priority basis due to the higher SOH, they become unusable before the end of the target using period. Therefore, when the battery group with the higher current SOH is charged and discharged on a priority basis, part of the battery group Gr may not be able to be used until the end of the target using period regardless of the existence of the battery group that can be used after the end of the target using period.

Therefore, in the present embodiment, the margin (hereinafter referred to as a SOH margin) at the end of the target using period of each battery group Gr is calculated, and the battery group Gr having the higher SOH margin is charged and discharged on a priority basis.

Specifically, an estimation value of the SOH (hereinafter referred to as an estimation SOH) of each battery module 100 at the end of the target using period is regularly calculated. The estimation SOH may be calculated based on the history of the previous SOH, or may be calculated based on the data obtained in advance by an experiment and the like.

Subsequently, in the present embodiment, the minimum value of the estimation SOH (hereinafter referred to as a minimum estimation SOH) of the plurality of battery modules 100 that constitute each battery group Gr is determined. Based on the determined minimum estimation SOH of each battery group Gr, the SOH margin is calculated by the following equation (2). The priority order of the charging and discharging (hereinafter referred to as charge and discharge priority order) is determined based on the calculated SOH margin. In this case, the higher the SOH margin is, the higher the charge and discharge priority order is.

[Formula 2]

$$SOH\ MARGIN = \frac{MINIMUM\ ESTIMATION\ SOH - LIFE\ SOH}{100 - LIFE\ SOH} \times 100\ [\%] \quad (2)$$

The charge/discharge controller 111 controls the connector 102 of FIG. 1 such that the battery group Gr having the relatively high charge and discharge priority order is charged and discharged on a priority basis based on the determined charge and discharge priority order, and the connector 102 selectively connects the plurality of battery groups Gr to the external object. Here, that the charging and discharging are performed on a priority basis, means that the frequency of usage is high or the duration of use is long as compared to other battery groups Gr. For example, when the amount of electric power that is required by the load is small, and it is necessary to supply the electric power to the external object from part (the battery group Gr of n; n is a natural number not less than one and not more than (m−1)) of the battery group of all (the battery group of m; m is a natural number not less than two) of the battery groups Gr, the switching element SW that corresponds to the battery group Gr having the charge and discharge priority order of "1" to "n" is turned on, and the switching element SW that corresponds to the battery group Gr having the charge and discharge priority order of "n+1" to "m" is turned off. When it is necessary to supply the electric power to the external object from all of the battery groups Gr, the switching elements SW that correspond to all of the battery groups Gr are turned on. Note that, the estimation SOH and the SOH margin are regularly calculated, so that the charge and discharge priority order is redetermined in each case.

Figure 3:
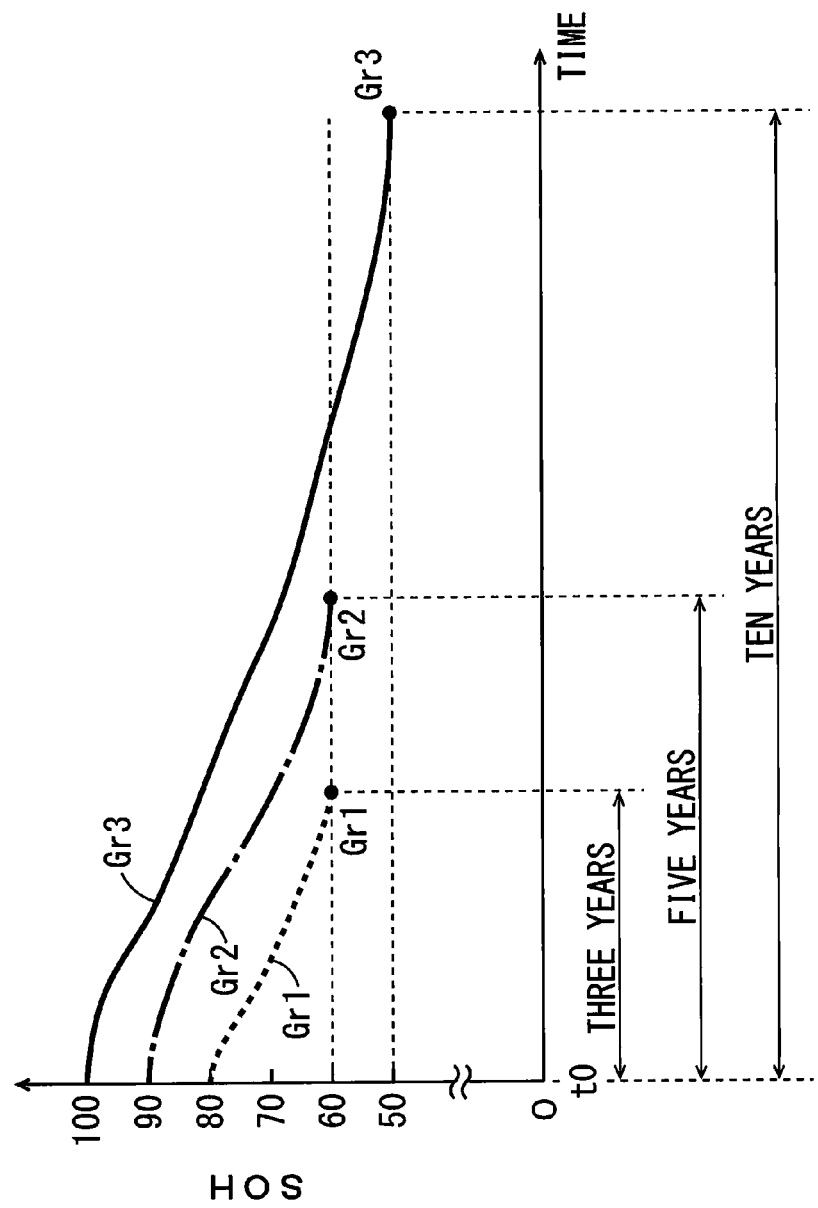
FIG. 3 is a diagram showing the changes in SOH of each battery group when a battery group having a higher SOH margin is charged and discharged on a priority basis.

FIG. 3 is a diagram showing the changes in SOH of the battery groups Gr1 to Gr3 when the battery group Gr having the higher SOH margin is charged and discharged on a priority basis. In table 2, the SOH, the minimum estimation SOH, the SOH margin and the charge and discharge priority order of the battery groups Gr1 to Gr3 at a time point at which one year has elapsed from the time point t0 are shown, and in table 3, the SOH, the minimum estimation SOH, the SOH margin and the charge and discharge priority order of the battery groups Gr1 to Gr3 at a time point at which two years have elapsed from the time point t0 are shown.

TABLE 2

AT TIME POINT AT WHICH ONE YEAR ELAPSED

| BATTERY GROUP | SOH [%] | MINIMUM ESTIMATION SOH [%] | SOH MARGIN [%] | CHARGE AND DISCHARGE PRIORITY ORDER |
|---|---|---|---|---|
| Gr1 | 75 | 65 | 12.5 | 2 |
| Gr2 | 86 | 70 | 25 | 1 |
| Gr3 | 95 | 47.5 | −5 | 3 |

TABLE 3

AT TIME POINT AT WHICH TWO YEARS ELAPSED

| BATTERY GROUP | SOH [%] | MINIMUM ESTIMATION SOH [%] | SOH MARGIN [%] | CHARGE AND DISCHARGE PRIORITY ORDER |
|---|---|---|---|---|
| Gr1 | 70 | 65 | 12.5 | 1 |
| Gr2 | 78 | 60 | 0 | 3 |
| Gr3 | 91 | 55 | 10 | 2 |

As shown in Table 2, regarding the SOH, at a time point at which one year has elapsed from the time point t0, the SOH of the battery group Gr3 is the highest, the SOH of the battery group Gr2 is the second highest and the SOH of the battery group Gr1 is the lowest. On the other hand, regarding the SOH margin, at a time point at which one year has elapsed from the time point t0, the SOH margin of the battery group Gr2 is the highest, the SOH margin of the battery group Gr1 is the second highest and the SOH margin of the battery group Gr3 is the lowest. In this case, the charge and discharge priority order of the battery group Gr2 is "1", the charge and discharge priority order of the battery group Gr1 is "2" and the charge and discharge priority order of the battery group Gr3 is "3", whereby the battery groups Gr1 to Gr3 are discharged in the descending order of the SOH margin not the descending order of the current SOH.

As shown in Table 3, at a time point at which two years have elapsed from the time point t0, the SOH of the battery group Gr3 is the highest, the SOH of the battery group Gr2 is the second highest and the SOH of the battery group Gr1 is the lowest. On the other hand, the SOH margin of the battery group Gr1 is the highest, the SOH margin of the battery group Gr3 is the second highest and the SOH margin of the battery group Gr2 is the lowest. Thus, as for the charge and discharge priority order, the charge and discharge priority order of the battery group Gr1 is "1", the charge and discharge priority order of the battery group Gr3 is "2" and the charge and discharge priority of the battery group Gr2 is "3".

In this manner, the charge and discharge priority order is regularly determined, and the battery group Gr having the higher determined charge and discharge priority order is charged and discharged on a priority basis. Thus, as shown in FIG. 3, the battery groups Gr1 to Gr3 can be respectively used until the end of the target using periods.

In the present example, because the SOH margin is calculated using the minimum estimation SOH of each battery group Gr, even in a case in which there are variations in SOH in the common battery group Gr, all of the battery modules 100 can be used until the end of the target using periods. On the other hand, in a case in which the differences are small in SOH in the common battery group Gr, or in a case in which usage of the common battery group Gr for a predetermined period of time is allowed even if the SOH is not more than the life SOH, the SOH margin may be calculated based on the average value of the SOH in each battery group Gr and the like instead of the minimum estimation SOH.

(1-3) Control Flow

Figure 4:
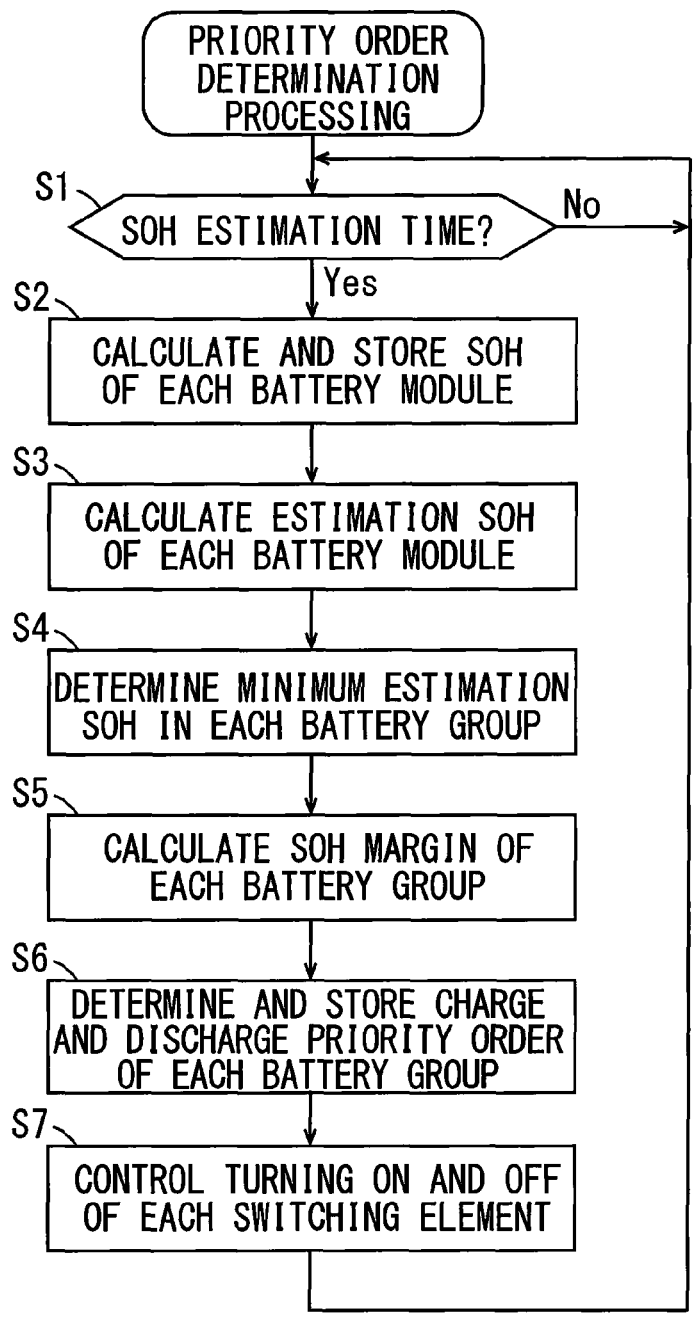
FIG. 4 is a flow chart of priority order determination processing.

The charge/discharge 111 performs priority order determination processing based on the control program stored in the memory or the storage 112. Thus, the charge and discharge priority order is determined, and the connecter 102 (FIG. 1) is controlled based on the determined charge and discharge priority order. FIG. 4 is a flow chart of the priority order determination processing.

As shown in FIG. 4, the charge/discharge controller 111 determines whether or not the current time is the estimation SOH calculation time that has been set in advance (step S1). Here, the estimation SOH calculation time is the time at which the estimation SOH is calculated and the SOH margin, and the charge and discharge priority order are determined using the calculated estimation SOH. The estimation SOH calculation time may be one per day, more than one per day or one every multiple days.

When the current time is not the estimation SOH calculation time, the charge/discharge controller 111 repeats the processing of step S1 until the current time is the estimation SOH calculation time that has been set in advance. When the current time is the estimation SOH calculation time, the charge/discharge controller 111 calculates the SOH of each battery module 100 based on the cell information supplied from each battery module 100, and stores the calculated SOH in the storage 112 as the history of SOH (step S2). The processing of step S2 is performed multiple times, so that the history of the SOH of each battery module 100 is stored in the storage 112.

Next, the charge/discharge controller 111 calculates the estimation SOH of each battery module 100 based on the history of SOH stored in the storage 112 (step S3). For example, the amount of change in SOH from the current time to the end of the target using period is estimated based on the amount of change in SOH in a constant period in the past (one year, for example). The estimated amount of change is subtracted from the current SOH such that the estimation SOH of each battery module 100 is obtained. While the estimation SOH is calculated based on the history of SOH stored in the storage 112 in the present example, the invention is not limited to this. The data obtained in advance by an experiment and the like may be stored in the storage 112, and the estimation SOH may be calculated based on the data.

Next, in the present embodiment, the charge/discharge controller 111 determines the minimum estimation SOH in each battery group Gr based on the calculated estimation SOH of each battery module 100 (step S4). Then, the charge/discharge controller 111 calculates the SOH margin of each battery group Gr by the above equation (2) based on the determined minimum estimation SOH (step S5).

Next, the charge/discharge controller 111 determines the charge and discharge priority order of each battery group Gr based on the calculated SOH margin (step S6), and controls the turning on and off of each switching element SW of the connector 102 based on the determined charge/discharge priority order (step S7). Thereafter, the charge/discharge controller 111 repeats the processing of steps S1 to S7. In this manner, the SOH margin is regularly calculated, and the charge and discharge priority order of each battery group Gr is redetermined based on the calculated SOH margin, whereby the controller 102 is controlled.

(1-4) Effects

In the battery system 500 according to the present embodiment, the SOH margin of each battery group Gr is calculated based on the SOH of each battery module 100, and the plurality of battery groups Gr are selectively connected to the external object based on the calculated SOH margin. Thus, the frequency of the charging and discharging of each battery group Gr can be adjusted according to the SOH margin. As a result, that part of the battery group Gr becomes unusable before the end of the target using period regardless of the existence of the battery group Gr that can be used after the end of the target using period, can be prevented.

Further, in the present embodiment, the battery group Gr having the relatively high SOH margin is charged and discharged on a priority basis. Thus, part of the battery group Gr can be reliably prevented from becoming unusable before the end of the target using period.

Further, in the present embodiment, the estimation SOH of each battery module 100 is calculated based on the history of the SOH of each battery module 100, and the SOH margin is calculated based on the calculated estimation SOH and the predetermined life SOH. Thus, the appropriate SOH margin can be easily calculated.

(1-5) MODIFIED EXAMPLES (1-5-1) First Modified Example

Figure 5:
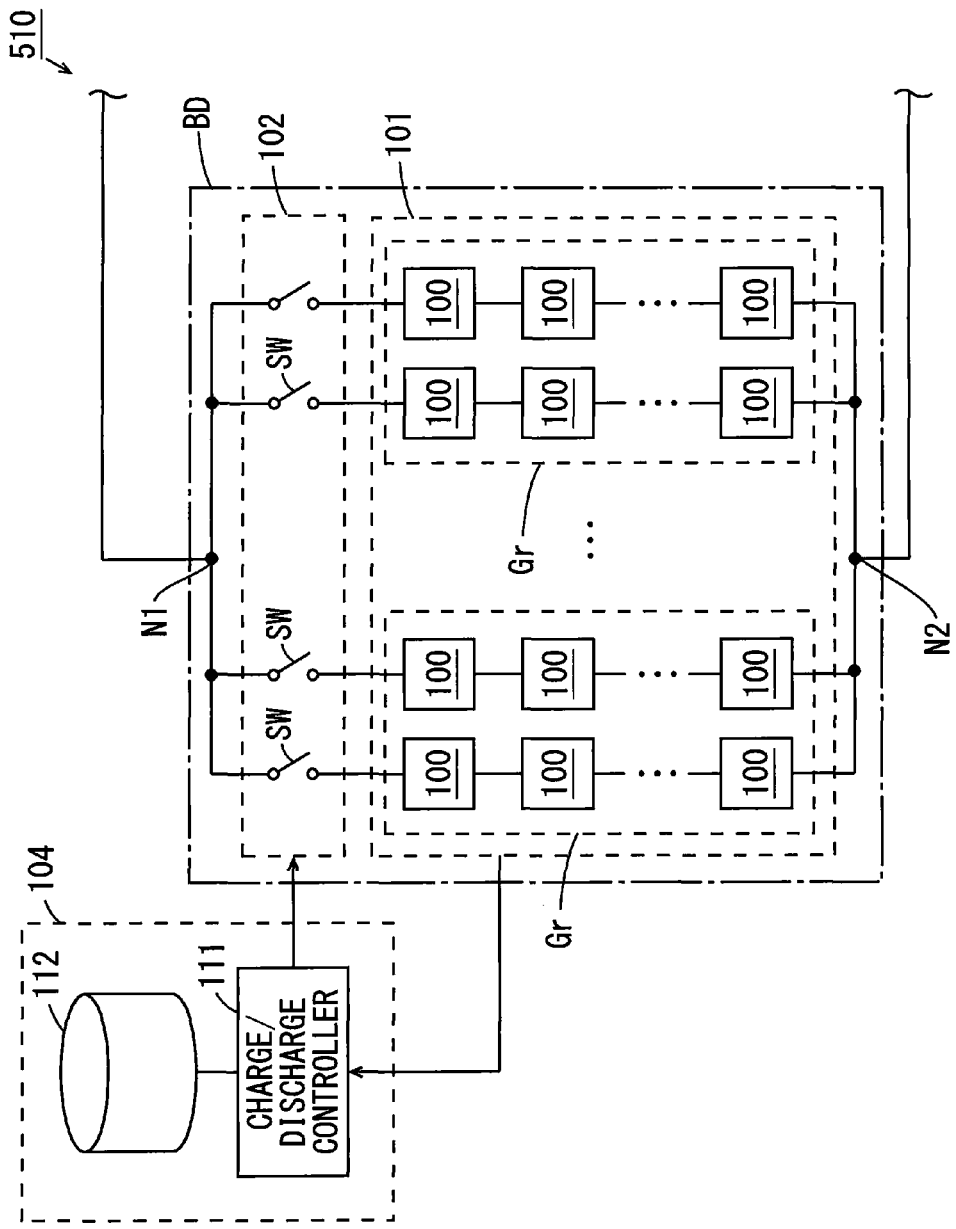
FIG. 5 is a diagram showing the first modified example of the battery system according to the embodiments.

FIG. 5 is a diagram showing a battery system 510 that is the first modified example of the battery system 500. As for the battery system 510, difference from the battery system 500 of FIG. 1 will be described.

In the battery system 510, each battery group Gr includes multiple pairs (two pairs that are parallel to each other in the example of FIG. 5) of the plurality of battery modules 100 that are connected in series. In this case, the plurality of battery groups Gr of FIG. 1 correspond to the one battery group Gr of FIG. 5. In the present example, in the common battery group Gr, the characteristics of the plurality of battery modules 100 are substantially the same. Hereinafter, the plurality of battery modules 100 that are connected in series are referred to as a battery module row.

In the present example, the charge and discharge priority order of each battery group Gr is determined, and the battery group Gr having the higher charge and discharge priority order is charged and discharged on a priority basis based on the determined charge and discharge priority order. In this case, the charging and discharging of the plurality of battery module rows included in the common battery group Gr are simultaneously performed.

Thus, that part of the battery group Gr becomes unusable before the end of the target using period regardless of the existence of the battery group Gr that can be used after the end of the target using period, can be prevented.

In the common battery group Gr, when the SOH of the plurality of battery module rows are different, the battery module row having the higher SOH may be charged and discharged on a priority basis. Thus, difference in SOH between the battery module rows in the common battery group Gr becomes small. Therefore, part of the battery group Gr can be prevented from becoming unusable before the end of the target using period.

The number of the battery module rows that are respectively included in the plurality of battery groups Gr may be the same or may be different from each other. For example, the battery group Gr that includes the plurality of battery module rows and the battery group Gr that includes the one battery module row may be mixed.

(1-5-2) Second Modified Example

Figure 6:
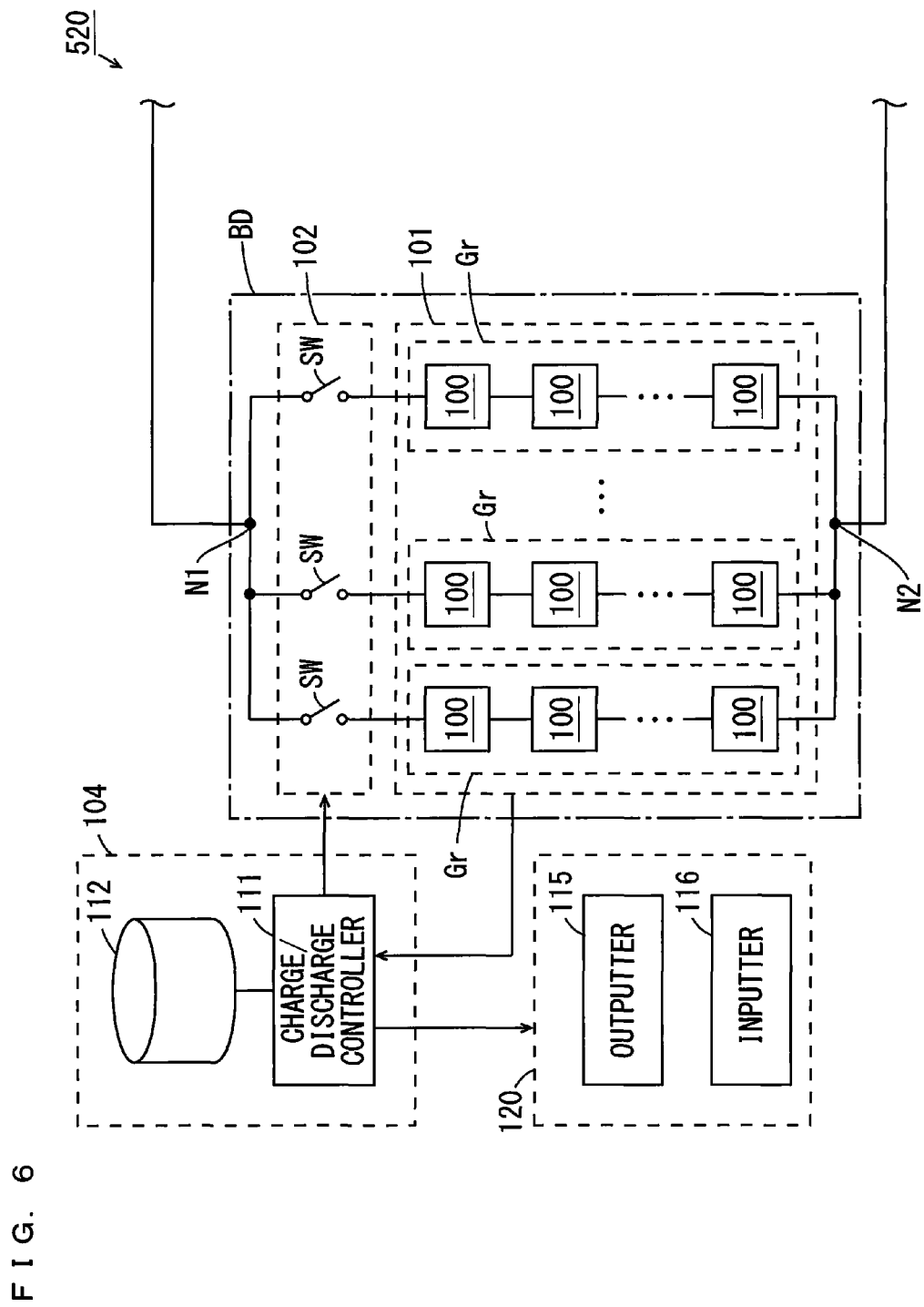
FIG. 6 is a diagram showing the second modified example of the battery system according to the embodiments.

FIG. 6 is a diagram showing a battery system 520 that is the second modified example of the battery system 500. Regarding the battery system 520, difference from the battery system 500 of FIG. 1 will be described.

The battery system 520 further includes an information presentation unit 120. The information presentation unit 120 is an example of a presentation unit. The information presentation unit 120 includes an outputter 115 and an inputter 116. The outputter 115 includes a speaker, a liquid crystal display or the like, and the inputter 116 includes a key board, a mouse and the like. In the present example, the outputter 115 is a liquid crystal display. The information presentation unit 120 is connected to the charge/discharge controller 111 through wires or by wireless.

In the battery system 520, the information of each battery group Gr is supplied from the charge/discharge controller 111 to the information presentation unit 120. Here, the information of each battery group Gr includes the information of past of each battery group Gr (history of SOH and the like, for example), the current information (current SOH and the like, for example) and the estimated information of future (estimation SOH and the like, for example). The outputter 115 displays the information of each battery group Gr supplied from the charge/discharge controller 111 as the battery state confirmation screen. FIG. 7 is a diagram showing one example of the battery state confirmation screen.

The battery state confirmation screen of FIG. 7 includes a group number, a module number, the target using period, the target remaining period, the current SOH, the life SOH, the minimum estimation SOH, the SOH margin, the charge and discharge priority order and the discharge ratio. The group number is an identification number assigned to each battery group Gr, and the module number is an identification number assigned to each battery module 100. A user or a service man checks the battery state confirmation state, so that the current state of each battery group Gr can be easily and accurately recognized.

Indicia, colors or the like may be added to the information that corresponds to the battery group Gr in which the charging or discharging is being performed at the current time point. In this case, the user or the service man can easily recognize the battery group Gr in which the charging or discharging is being performed. Further, a message for explaining the current state may be displayed by the outputter 115. For example, "Currently, the battery group of group number '1' with the lowest SOH margin is being discharged." may be displayed by the outputter 115.

A time point at which the SOH of each battery group Gr is not more than the life SOH (hereinafter referred to as a estimation life-span time point) may be displayed by the outputter 115. In this case, the charge/discharge controller 111 estimates the estimation life-span time point based on the history of the SOH of each battery module 100 stored in the storage 112, and the estimation life-span time point is supplied to the information presentation unit 120.

It may be possible for the user or the service man to change the priority order and the target using period of each battery group Gr. In this case, the user or the service man operates the inputter 116 such that the priority order and the target using period of each battery group Gr are changed. When the estimation life-span time point is displayed in the outputter 115 as described above, the user or the service man can reset the target using point based on the estimation life-span time point displayed in the outputter 115.

(1-5-3) Third Modified Example

The amount of change in SOH of each battery module 100 is influenced by power demand and an outside temperature. The power demands and the outside temperatures are different depending on the time of the year. Therefore, in the third modified example, the charge/discharge controller 111 learns a tendency of changes in SOH of each battery module 100 that corresponds to the time of the year, and calculates the estimation SOH of each battery module 100 based on the learnt tendency of changes.

Figure 8:
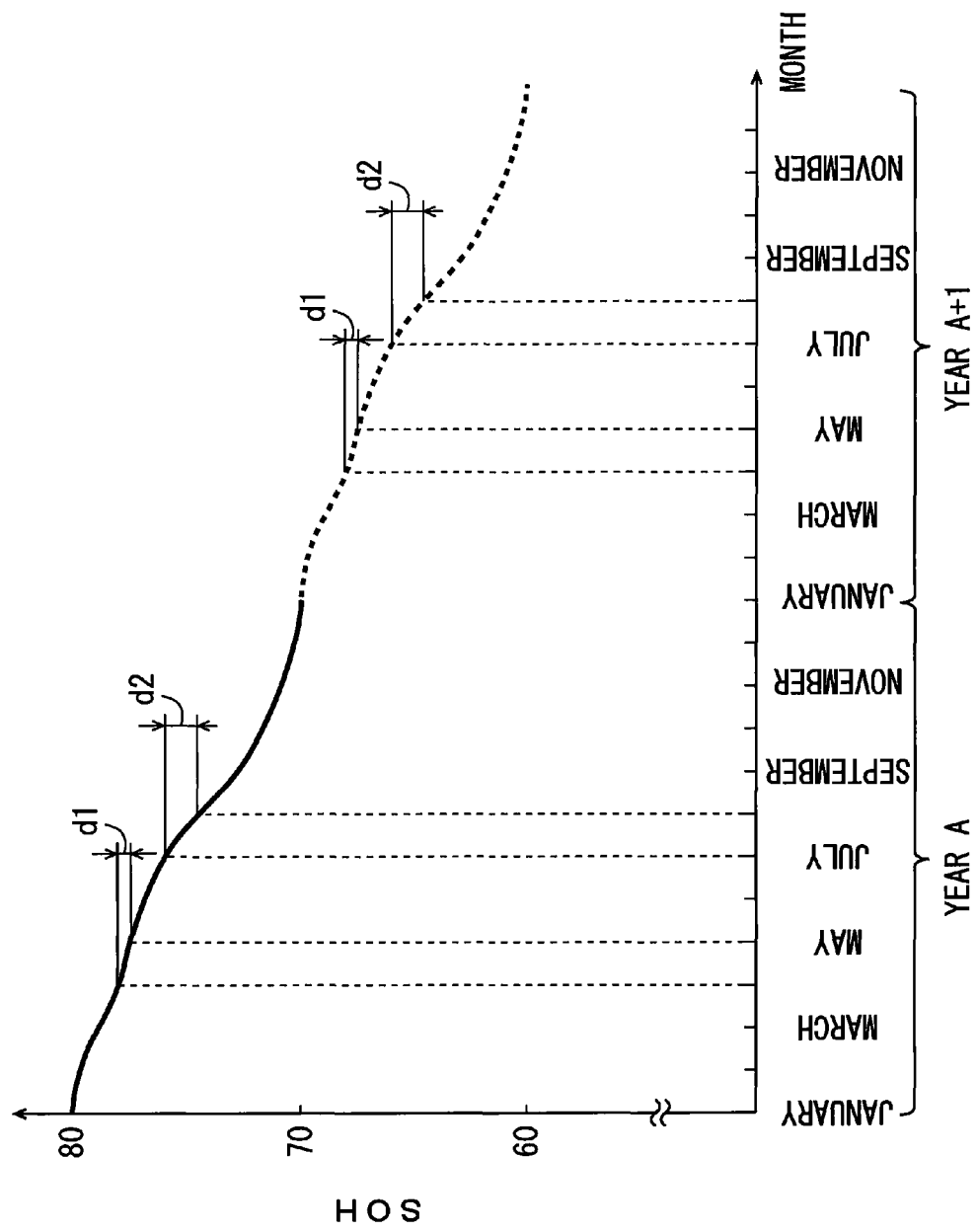
FIG. 8 is a diagram showing the changes in SOH of the one battery module in the third modified example.

FIG. 8 is a diagram showing the changes in SOH of the one battery module 100 in a period from January, year A to December, year (A+1). In the example of FIG. 8, the history of SOH from January to December, year A is stored in the storage 112. The charge/discharge controller 111 estimates the changes in SOH in year (A+1) on a monthly basis based on the history of SOH stored in the storage 112.

For example, the amount of change in SOH in April, year A is d1. Further, the amount of change in SOH in July, year A is d2. In this case, the amount of change in SOH in April, year (A+1) is estimated to be d1, and the amount of change in SOH in July, year (A+1) is estimated to be d2 based on the history of the SOH stored in the storage 112. The amount of change in another month is similarly estimated.

In this manner, the changes in SOH of each battery module 100 are estimated on a monthly basis. The estimation SOH of each battery group Gr is calculated based on the estimation. Thus, the more accurate estimation SOH is obtained.

While the changes in SOH of each battery module 100 are estimated on a monthly basis in the present example, the invention is not limited to this. For example, the changes in SOH of each battery module 100 may be estimated on a weekly basis, or may be estimated on a daily basis. Further, the outside temperatures differ depending on the time of the day, so that the changes in SOH of each battery module 100 in the future may be estimated on an hourly basis.

(1-5-4) Fourth Modified Example

Figure 9:
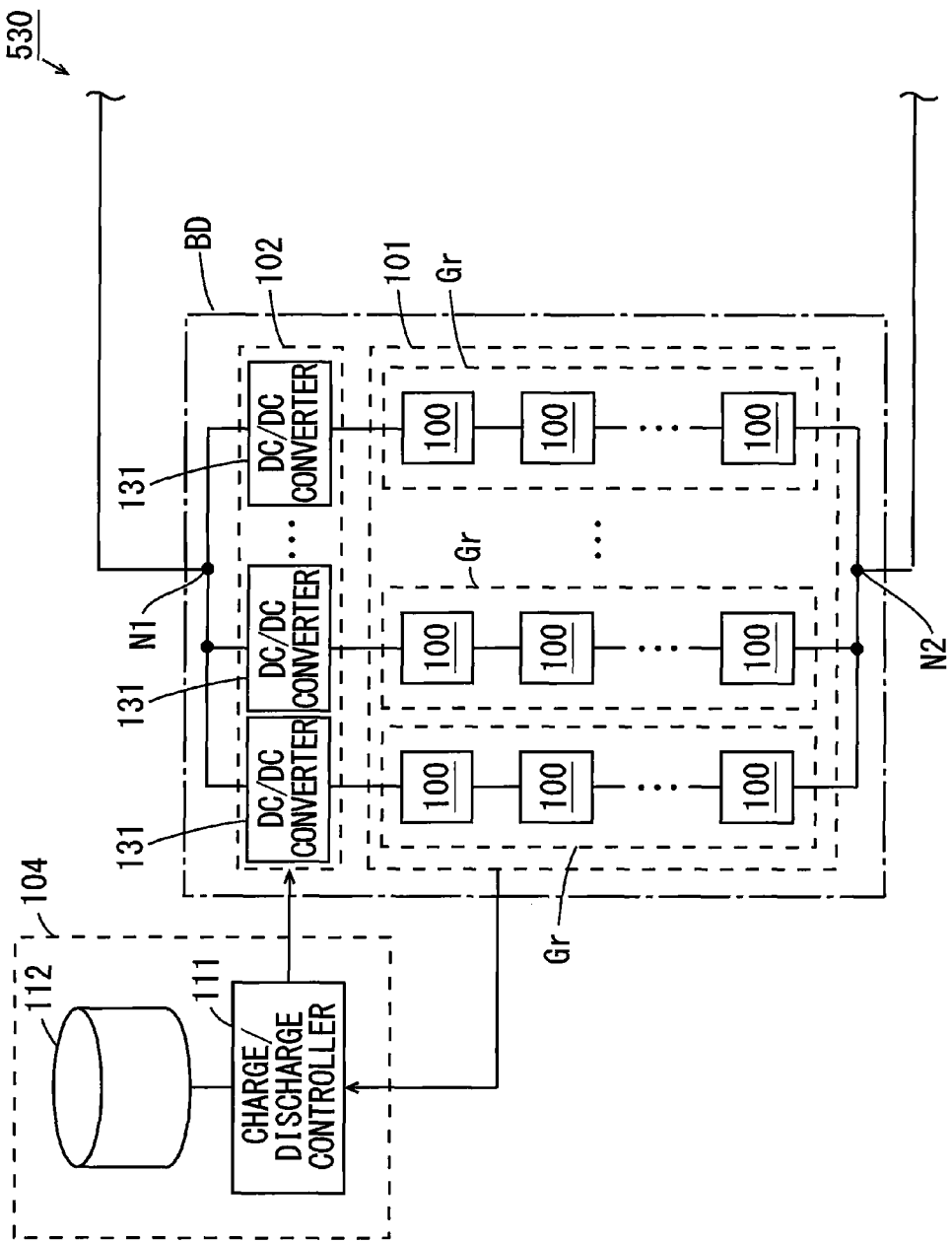
FIG. 9 is a diagram showing the fourth modified example of the battery system according to the embodiments.

FIG. 9 is a diagram showing a battery system 530 that is the fourth modified example of the battery system 500. As for the battery system 530, difference from the battery system 500 of FIG. 1 will be described.

In the battery system 530, the connector 102 includes a plurality of DC/DC converters 131 instead of the plurality of switching elements SW. The plurality of DC/DC converters 131 correspond to the plurality of battery groups Gr, respectively.

The plurality of DC/DC converters 131 are respectively controlled by the charge/discharge controller 111 such that the charging and discharging of the plurality of battery groups Gr are controlled. In the present example, the battery group Gr having the higher SOH margin is charged and discharged on a priority basis.

In this case, presence/absence of the supply of electric power between each battery group Gr and the external objects (the power outputter 108 and the power reception equipment 109) can be controlled and the supply amount of electric per between the battery group Gr and the external objects can be controlled. For example, the higher the charge and discharge priority order is, the larger the charged capacity or the discharge amount can be. In this case, the necessary amount of electric power can be effectively obtained while the charging and discharging of the battery group Gr having the low charge and discharge priority order is suppressed.

When the battery system 530 is used for the power source device 700, the power conversion device 103 may only have the DC/AC converter 103b. Further, in addition to the plurality of DC/DC converters 131, or instead of the plurality of DC/DC converters 131, the plurality of DC/AC converters that respectively correspond to the plurality of battery groups Gr can be used. In this case, the power conversion device 103 does not have to be provided.

(2) Electric Vehicle and Movable Object

The electric vehicle and the movable object according to the second embodiment of the present invention will be described. The electric vehicle and the movable object according to the present embodiment include the battery system 500 according to the first embodiment. Note that, in the following, an electric automobile will be described as one example of the electric vehicle.

(2-1) Configuration And Operation

Figure 10:
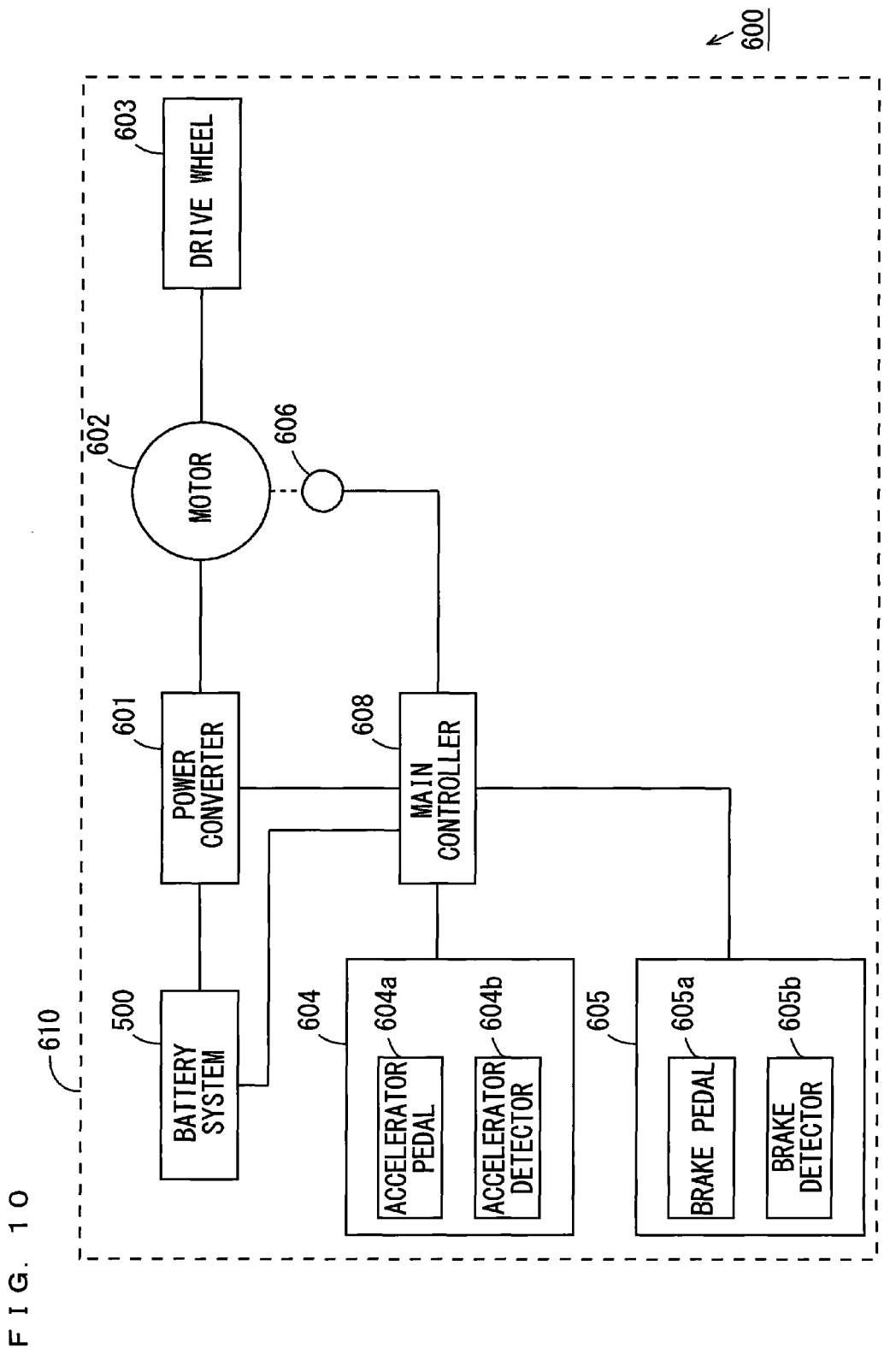
FIG. 10 is a block diagram showing the configuration of an electric automobile according to the second embodiment.

FIG. 10 is a block diagram showing the configuration of the electric automobile. As shown in FIG. 10, the electric automobile 600 according to the present embodiment includes a vehicle body 610. The vehicle body 610 is provided with the afore-mentioned battery system 500, a power converter 601, a motor 602, a drive wheel 603, an accelerator device 604, a brake device 605, a rotational speed sensor 606 and a main controller 608. If the motor 602 is an alternating current (AC) motor, the power converter 601 includes an inverter circuit.

The battery system 500 is connected to the motor 602 via the power converter 601, and connected to the main controller 608. The charge/discharge controller 111 (FIG. 1) of the battery system 500 calculates the charged capacity of each battery module 100 based on the cell information of each battery module 100.

The charged capacity and the like of each battery module 100 is supplied from the charge/discharge controller 111 to the main controller 608. Further, the accelerator device 604, the brake device 605 and the rotational speed sensor 606 are connected to the main controller 608. The main controller 608 includes a CPU, a memory or a microcomputer, for example. Note that, the charge/discharge controller 111 may have the function of the main controller 608. In this case, the main controller 608 does not have to be provided.

The accelerator device 604 includes an accelerator pedal 604a and an accelerator detector 604b that detects an operation amount (depression amount) of the accelerator pedal 604a, which are included in the electric automobile 600. When a user operates the accelerator pedal 604a, the accelerator detector 604b detects the operation amount of the accelerator pedal 604a using a state in which the accelerator pedal is not operated by the user as a basis. The detected operation amount of the accelerator pedal 604a is supplied to the main controller 608.

The brake device 605 includes a brake pedal 605a and a brake detector 605b that detects an operation amount (depression amount) of the brake pedal 605a by the user, which are included in the electric automobile 600. When the user operates the brake pedal 605a, the brake detector 605b detects the operation amount of the brake pedal 605a. The detected operation amount of the brake pedal 605a is supplied to the main controller 608. The rotational speed sensor 606 detects a rotational speed of the motor 602. The detected rotational speed is supplied to the main controller 608.

As described above, each battery module 100, the operation amount of the accelerator pedal 604a, the operation amount of the brake pedal 605a, and the rotational speed of the motor 602 are supplied to the main controller 608. The main controller 608 performs charge/discharge control of the connection battery module 100 and electric power conversion control of the electric power converter 601 based on these information. For example, when the electric automobile 600 is started and accelerated based on an accelerator operation, electric power of the connection battery module 100 is supplied from the battery system 500 to the electric power converter 601.

Further, the main controller 608 calculates a torque (a command torque) to be transmitted to the drive wheel 603 based on the supplied operation amount of the accelerator pedal 604a, and supplies a control signal based on the command torque to the electric power converter 601.

The electric power converter 601, which has received the above-mentioned control signal, converts the electric power supplied from the battery system 500 into electric power required to drive the drive wheel 603 (driving electric power). Thus, the driving electric power obtained in the conversion by the electric power converter 601 is supplied to the motor 602, and the torque of the motor 602 based on the driving electric power is transmitted to the drive wheel 603.

On the other hand, at the time of decelerating the electric automobile 600 based on a braking operation, the motor 602 functions as a power generation device. In this case, the electric per converter 601 converts regenerated electric power generated by the motor 602 into electric power suited to charge the battery module 100, and supplies the electric power to the connection battery module 100. Thus, the connection battery module 100 is charged.

(2-2) Effects

In the electric automobile 600 according to the present embodiment, the battery system 500 according to the above-mentioned first embodiment is used. Therefore, part of the battery group Gr can be prevented from becoming unusable before the end of the target using period. Thus, reliability of the electric automobile 600 is improved.

(2-3) Other Movable Object

The battery system 500 according to the first embodiment may be loaded in another movable object such as a ship, an airplane, an elevator, or a walking robot.

The ship, which is loaded with the battery system 500, includes a hull instead of the vehicle body 610 of FIG. 17, includes a screw instead of the drive wheel 603, includes an acceleration inputter instead of the accelerator device 604, and includes a deceleration inputter instead of the brake device 605, for example. A driver operates the acceleration inputter instead of the accelerator device 604 in accelerating the hull, and operates the deceleration inputter instead of the brake device 605 in decelerating the hull.

The airplane, which is loaded with the battery system 500, includes an airframe instead of the vehicle body 610 of FIG. 17, includes a propeller instead of the drive wheel 603, includes an acceleration inputter instead of the accelerator device 604, and includes a deceleration inputter instead of the brake device 605, for example. Note that, the ship and the airplane do not have to include the deceleration inputter. In this case, a driver stops the acceleration by operating the acceleration inputter such that the airframe decelerates due to the resistance of water or the resistance of air.

The elevator, which is loaded with the battery system 500, includes a cage instead of the vehicle body 610 of FIG. 17, includes an hoist rope, which is attached to the cage, instead of the drive wheel 603, includes an acceleration inputter instead of the accelerator device 604, and includes a deceleration inputter instead of the brake device 605, for example.

The walking robot, which is loaded with the battery system 500, includes a body instead of the vehicle body 610 of FIG. 17, includes feet instead of the drive wheel 603, includes an acceleration inputter instead of the accelerator device 604, and includes a deceleration inputter instead of the brake device 605, for example.

In these movable objects, the motor corresponds to a power source. The hull, the airframe, the cage and the body correspond to a main body. The screw, the propeller, the hoist rope and the feet correspond to a driving unit. The power source receives the electric power from the battery system 500, to convert the electric power into power, and the driving unit moves the mobile main body with the power obtained in the conversion by the power source.

(2-4) Effects In Other Movable Objects

Even in these various types of the movable objects, it is possible to prevent part of the battery group Gr from becoming unusable before the end of the target using period by using the battery system 500 according to the above-mentioned second embodiment. Thus, reliability of the movable object is improved.

In the above-mentioned electric vehicle and the movable objects, any one of the battery systems 510, 520, 530 may be used instead of the battery system 500.

(3) Other Embodiments (3-1)

While the SOH is used as the deterioration amount (the deterioration amount of the battery group Gr) of the battery module 100 in the above-mentioned embodiment, the invention is not limited to this. Other values such as the capacity maintaining ratio, the full charge capacity or the internal resistance may be used as the deterioration amount. The more deteriorated the battery module 100 is, the smaller the capacity maintaining ratio of the battery module 100 is. The more deteriorated the battery module 100 is, the larger the full charge capacity of the battery module 100 is. The more advanced the deterioration of the battery module 100 is, the larger the inner resistance of the battery module 100 is.

(3-2)

While the one battery group Gr is constituted by the plurality of battery modules 100 in the above-mentioned embodiment, the invention is not limited to this. The one battery group Gr may be constituted by the one battery module 100.

(4) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the battery module 100 is an example of a battery module, the battery group Gr is an example of a battery group, the battery systems 500, 510, 520, 530 are examples of a battery system, the battery control device 105 is an example of a battery control device, the connecter 102 is an example of a connector, the controller 104 is an example of a controller and a system controller, the SOH is an example of a deterioration amount, the SOH margin is an example of a margin, the life SOH is an example of an allowable value and the information presentation unit 120 is an example of a presentation unit.

Further, the electric automobile 600 is an example of an electric vehicle and a movable object, the motor 602 is an example of a motor and a power source, the drive wheel 603 is an example of a drive wheel and a driving unit, the vehicle body 610 is an example of a mobile main body, the power source device 700 is an example of a power source device and the power conversion device 103 is an example of a power conversion device.

As each of constituent elements recited in the claims, various other elements having configurations or functions described in the claims can be also used.

The invention claimed is:

1. A battery system comprising:
a plurality of battery groups that respectively include at least one battery module including at least one battery cell, and have predetermined target using periods;
a connector for selectively connecting the plurality of battery groups to an external object; and
a controller that calculates a margin at the end of the target using period of each battery group based on a deterioration amount of each battery group, and controls the connector based on the calculated margin.

2. The battery system according to claim 1, wherein
the controller controls the connector such that the battery group having the relatively high margin is charged and discharged on a priority basis.

3. The battery system according to claim 2, wherein
the controller estimates a deterioration amount of each battery group at the end of the target using period, and calculates the margin based on the estimated deterioration amount and a predetermined allowable value of the deterioration amount.

4. The battery system according to claim 3, wherein
the controller stores a history of the deterioration amount of each battery group, and estimates the deterioration amount of each battery group at the end of the target using period based on the stored history.

5. The battery system according to claim 4, wherein
the controller learns a tendency of changes in deterioration amount of each battery group, and estimates the deterioration amount of each battery group at the end of the target using period based on the learnt tendency of the changes.

6. The battery system according to claim 1, further comprising:
a presentation unit for presenting information of each battery group.

7. An electric vehicle, comprising:
the battery system according to claim 1;
a motor driven by electric power supplied from the battery system; and
a drive wheel that is rotated by a torque of the motor.

8. A movable object comprising:
the battery system according to claim 1;
a mobile main body;
a power source that converts electric power supplied from the battery system into power; and
a driving unit that moves the mobile main body by the power obtained in conversion by the power source.

9. A power source device that is connectable to an external object, comprising:
the battery system according to claim 1;
a power conversion device that performs power conversion between the battery system and the external object; and
a system controller that performs control regarding discharging and charging of each battery group of the battery system by controlling the power conversion device.

10. The battery system according to claim 2, wherein
the controller stores a history of the deterioration amount of each battery group and estimates the deterioration amount of each battery group at the end of the target using period based on the stored history.

11. The battery system according to claim 10, wherein
the controller learns a tendency of changes in deterioration amount of each battery group, and estimates the deterioration amount of each battery group at the end of the target using period based on the learnt tendency of the changes.

12. The battery system according to claim 1, wherein
the controller estimates the deterioration amount of each battery group at the end of the target using period, and calculates the margin based on an allowable value of the estimated deterioration amount and a predetermined deterioration amount.

13. The battery system according to claim 12, wherein
the controller stores a history of the deterioration amount of each battery group, and estimates the deterioration amount of each battery group at the end of the target using period based on the stored history.

14. The battery system according to claim 13, wherein
the controller learns a tendency of changes in deterioration amount of each battery group, and estimates the deterioration amount of each battery group at the end of the target using period based on the learnt tendency of changes.

15. The battery system according to claim 1, wherein
the controller stores a history of the deterioration amount of each battery group, and estimates the deterioration amount of each battery group at the end of the target using period based on the stored history.

16. The battery system according to claim 15, wherein
the controller learns a tendency of changes in deterioration amount of each battery group and estimates the deterioration amount of each battery group at the end of the target using period based on the learnt tendency of changes.

17. A battery control device that controls charging and discharging of a plurality of battery groups that respectively include at least one battery module including at least one battery cell and have predetermined target using periods, comprising:
 a connector for selectively connecting the plurality of battery groups to an external object; and
 a controller that calculates a margin at the end of the target using period of each battery group based on a deterioration amount of each battery group, and controls the connector based on the calculated margin.

* * * * *